United States Patent
Grubsky et al.

(10) Patent No.: US 6,850,665 B2
(45) Date of Patent: Feb. 1, 2005

(54) WAVELENGTH-SELECTIVE OPTICAL FIBER COMPONENTS USING CLADDING-MODE ASSISTED COUPLING

(75) Inventors: Victor Grubsky, Los Angeles, CA (US); Dmitry Starodubov, Los Angeles, CA (US)

(73) Assignee: Sabeus Photonics, Chatsworth, CA (US)

( * ) Notice: Subject to any disclaimer, the term of this patent is extended or adjusted under 35 U.S.C. 154(b) by 0 days.

(21) Appl. No.: 10/073,425

(22) Filed: Feb. 11, 2002

(65) Prior Publication Data

US 2002/0122629 A1 Sep. 5, 2002

Related U.S. Application Data

(63) Continuation of application No. 09/310,295, filed on May 12, 1999, now Pat. No. 6,360,038.

(51) Int. Cl.[7] .............................................. G02B 6/26
(52) U.S. Cl. .......................... 385/28; 385/27; 385/37; 385/50; 385/30; 398/87
(58) Field of Search ............................ 385/28, 27, 37, 385/50, 123, 30, 24; 359/124, 130; 398/87

(56) References Cited

U.S. PATENT DOCUMENTS

| | | | |
|---|---|---|---|
| 4,761,833 A | * | 8/1988 | Epworth ..................... 455/612 |
| 5,187,760 A | | 2/1993 | Huber |
| 5,430,817 A | | 7/1995 | Vengsarkar |
| 5,457,758 A | | 10/1995 | Snitzer |
| 5,550,940 A | | 8/1996 | Vengsarkar et al. |
| 5,778,119 A | | 7/1998 | Farries |
| 5,805,751 A | | 9/1998 | Kewitsch et al. |
| 6,011,881 A | | 1/2000 | Moslehi et al. |
| 6,088,495 A | * | 7/2000 | Vorobeichik et al. ......... 385/28 |
| 6,104,852 A | * | 8/2000 | Kashyap ..................... 385/123 |
| 6,360,038 B1 | * | 3/2002 | Grubsky ..................... 385/28 |
| 2002/0122615 A1 | | 9/2002 | Painter et al. |

OTHER PUBLICATIONS

Kashyap, R. et al. "All–Fiber Narrowband Reflection Gratings at 1500 nm," Electronics Letters 24th May 1990, pp. 730–732, vol. 26, No. 11.

Bilodeau, F. et al. "An All–Fiber Dense–Wavelength–Division Multiplexer/Demultiplexer Using Photoimprinted Bragg Gratings, " IEE Photonics Technology Letters, Apr. 1995, pp. 388–390, vol. 7, No. 4.

Starodubov, D. et al. "All–Fiber Bandpass Filter With Adjustable Transmission Using Cladding–Mode Coupling," IEE Photonics Technology Letters, Nov. 1998, pp. 1590–1592, vol. 10, No. 11.

Grubsky, V. et al. "Fabrication of Long–Period Fiber Gratings with No Harmonics" IEE Photonics Technology Letters, Jan. 1999, pp. 87–89, vol. 11, No. 1.

Becker, P.C. et al. "Erbium–Doped Fiber Amplifiers," Copyriight 1999, pp. 55–63, Academic Press, San Diego, London, Boston, New York, Sydney, Tokyo, Toronto.

* cited by examiner

Primary Examiner—Rodney Bovernick
Assistant Examiner—Sung Pak
(74) Attorney, Agent, or Firm—Fulwider Patton

(57) ABSTRACT

A wavelength-selective optical device for coupling of light at predetermined wavelength from one optical fiber waveguide to another using at least two gratings and cladding-mode assisted coupling is disclosed. The transfer of light is performed using intermediate coupling to one or more cladding mode of the waveguides. In the case when the fibers have physically different cladding's, an arrangement for transfer of light from one cladding to another is required. The disclosed coupler has no back-reflection, small insertion loss, and very high channel isolation. The device can be used in wavelength-division multiplexing networks.

17 Claims, 7 Drawing Sheets

WAVELENGTH-SELECTIVE OPTICAL FIBER COMPONENTS USING CLADDING-MODE ASSISTED COUPLING

CROSS REFERENCE TO RELATED APPLICATIONS

This application is a continuation of Ser. No. 09/310,295 filed May 12, 1999, now U.S. Pat. No. 6,360,038, which is incorporated herein by reference.

BACKGROUND OF THE INVENTION

The present invention relates to optical devices for use in coupling light from one optical fiber to another, and to the use of such devices for optical communications.

Low insertion loss, wavelength-selective optical couplers are important components for optical fiber communications, especially for optical communications systems that use wavelength-division multiplexing (WDM). WDM systems transmit many optical channels in one fiber, with each channel being distinguished by its central wavelength. For efficient operation of a WDM communication system, the system should include the abilities to selectively add, drop and reroute channels. Ideal wavelength-selective couplers should have low insertion loss (<1 dB), high channel isolation (>30 dB), low back-reflection, and low cost. A number of wavelength-selective couplers are currently commercially available, but it is believed that none of the currently used couplers adequately meet all of the above desired characteristics.

One configuration for selecting a single channel from many channels in a fiber uses a 2×2 coupler with a fiber Bragg grating affixed to one of the coupler's outputs (e.g., Kashyap et al., Electronics Letters 26, p. 730 (1990)). Multi-wavelength input light enters one the coupler's inputs and becomes split between the two outputs. The Bragg grating at one output is chosen to reflect the desired wavelength, and light at this wavelength is emitted from the second input. This device exhibits high loss (3 dB) for all of the unselected channels and even higher loss (6 dB) for the selected channel. Such loss will typically by unacceptably high for commercial applications.

Another approach uses an optical circulator in combination with a Bragg grating at the circulator output, P. C. Becker et al., *Erbium Doped Fiber Amplifiers*, pp. 55–58, Academic Press (1999)). While such a configuration has a smaller insertion loss (about 2 dB), the high cost of circulators makes this device expensive.

Bilodeau et al. (Photonics Technology Letters 7, p. 388 (1995)) fabricated a fiber Mach-Zehnder interferometer that served as a wavelength-selective coupler. In order to add or drop a channel, this device relies on a precisely adjusted phase difference between two interferometer arms. This design makes the device undesirably sensitive to environmental conditions, especially temperature.

Other coupler designs use evanescent coupling of light between two fibers within a tapered region of a fused coupler. Snitzer (U.S. Pat. No. 5,457,758) used Bragg gratings to redirect the selected wavelength of light into a separate output of the coupler. Kewitsch et al. (U.S. Pat. No. 5,805,751) used a coupler with two dissimilar fibers. A Bragg grating inscribed within one of the fibers coupled light into a backward-propagating mode of the second fiber; non-resonant wavelengths were not affected and propagated with small losses through the first fiber. However, making a wavelength-selective coupler based on a fused fiber coupler requires very uniform fusion of two fibers over the length of the coupling region, making such devices difficult to manufacture.

Unlike a short-period Bragg grating, a long-period grating can couple light from a core mode into a different forward-propagating core mode (Hill et al., U.S. Pat. No. 5,216,739) or into a forward-propagating mode of the cladding (Vengsarkar, U.S. Pat. No. 5,430,817). Vengsarkar and Walker (U.S. Pat. No. 5,550,940) proposed a fused coupler-based device that uses a long-period grating. In that device, the cores of two optical fibers are spaced sufficiently far apart so that, in the absence of any gratings, there is negligible coupling of light between the two fiber cores. A single long-period grating inscribed in one fiber's core couples input light into a common cladding. A fraction of light in the cladding mode will then couple into the second fiber core provided that the interaction length is very small. This restriction limits the amount of light coupling and broadens the width of the coupling resonance.

SUMMARY OF THE INVENTION

A wavelength-selective optical coupler according to the present invention uses two or more gratings in two or more waveguides, such as optical fibers, to transfer light at a desired and selected wavelength from the core of one optical fiber into the core of another optical fiber through a coupling region that may include a common cladding or two claddings positioned close together to define a coupling region between them.

The wavelength-selective coupler of the present invention may use short-period (Bragg) gratings, but preferably uses long-period gratings. Alternatively, some of the gratings could be short period gratings and some of the gratings could be long period gratings. In an optical fiber, short-period gratings couple light from one mode to a counterpropagating mode. The period of a short-period grating in an optical fiber ranges from approximately 0.1 micron to 2 microns. In contrast, long-period gratings couple light between modes traveling in the same direction down a length of optical fiber. The period of long-period gratings falls in the range of approximately 10 microns to 1000 microns. Because long-period gratings couple light into forward-propagating modes, there is little back-reflected light. Long-period gratings do not cause loss for non-resonant wavelengths, so the insertion loss of the invented coupler is limited only by its splicing loss, which can be reduced to less than 0.1 dB. Channel isolation can be very high (>40 dB) because the device uses three stages of coupling (core-cladding, cladding—cladding cladding, cladding-core) which effectively filter out non-resonant light. Temperature dependence of the resonance wavelength of the long-period gratings can be eliminated by proper design of the fiber, as disclosed, for example, in U.S. Pat. No. 5,703,978.

A number of different configurations can be employed. In each case, there are two fibers, each with a core, and with either a separate cladding for each of them or a common cladding. The fibers are positioned close together over a common length in a region referred to as the coupling region. The fibers may be wrapped and held together, but preferably are not fused together because such a fusing process can make it difficult to fabricate uniform gratings in the fibers. The coupling region preferably keeps the claddings no more than 10 microns apart over a distance of about 1 mm–500 mm in a lengthwise direction. The gratings can be formed in the cores or in the claddings of the respective fibers, and can be designed to obtain the desired spectral dependence of coupling. The grating can be apodized to reduce coupling at unwanted wavelengths.

Variations and additions are possible, including the addition of a third fiber with a core, cladding, and grating, for providing light at a desired wavelength from the third fiber to a first of the fibers, while the second fiber has a coupling region with the first to receive light at another desired wavelength. With just two fibers having a coupling region, gratings in the first fiber on either side of the coupling region and a grating in the second fiber at the coupling region, a total of two fibers can be used to both add and drop light at a desired wavelength or at different wavelengths.

These couplers can be made tunable in wavelength by varying the periodicity of the long-period gratings or the refractive indices of the cores or claddings. Similarly, the devices can vary the intensity of the light in the fibers by varying the strength of one or more of the gratings. Alternatively, the cladding modes can be altered to vary the coupling between them. For example, the attenuation of the cladding modes or the propagation constant of the cladding modes can be varied. The coupling between modes can be varied by altering the strength of one or more of the gratings.

The present invention relates not only to the use of circular optical fibers, but also to any other geometries of fibers or other waveguides that incorporate a waveguiding cladding.

Preferably the fibers should be single-mode at the wavelength of operation. Alternatively, the fiber cores could support more than one mode. Any number of fibers may be placed in optical contact with each other, or in close proximity, so that there is coupling between their cladding modes. There can by an arbitrary number of input fibers, as well as an arbitrary number of output fibers. Multiple long-period gratings may be inscribed within each fiber for coupling multiple channels.

The present invention thus provides a wavelength-selective optical coupler that presents negligible loss to all unselected channels, that has negligible sensitivity to temperature variations, that can be manufactured economically, that has high channel isolation, and that has no back-reflection. The wavelength selective coupler of the present invention can be used to make an add/drop filter to add light at a desired wavelength, filter out light at a desired wavelength, or both, especially for WDM communications systems. The present invention has a wide range of applications, including combining multiple light sources into one fiber. In particular, several pumping lasers having different wavelengths may be combined in a single fiber thereby increasing the intensity of light in that fiber for efficient pumping of a fiber laser. The present invention can also be used, for example, to multiplex signals in the 1550 nm and 1300 nm communications bands.

According to the present invention, a grating can also be used to couple light from an optical fiber to a planar waveguide and back without fiber termination. A grating in the fiber couples light from the core to the cladding. The waveguide is put next to the fiber, and the light is coupled from the cladding to the waveguide.

Other features and advantages will become apparent from the following detailed description, drawings, and claims.

DETAILED DESCRIPTION

Figure 1A:
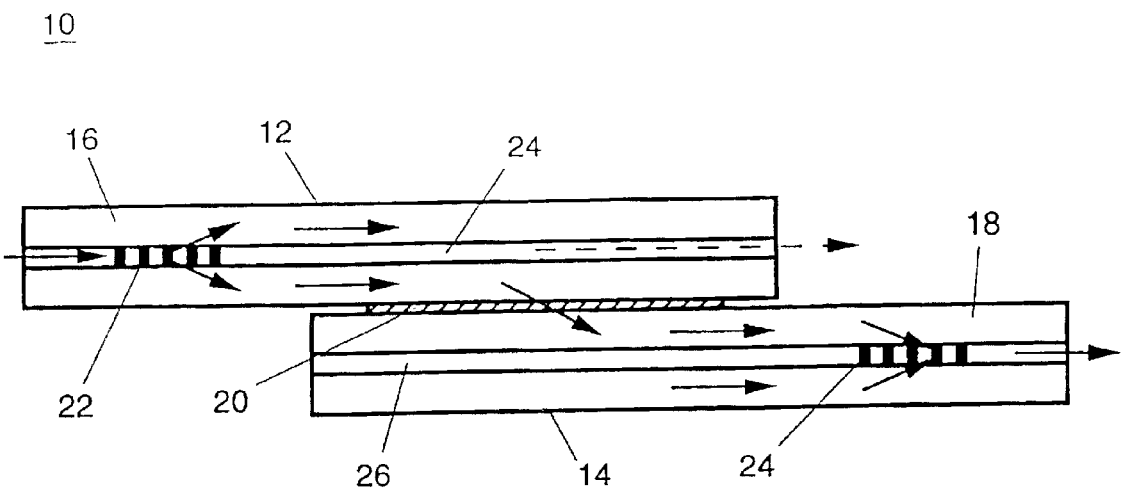
FIGS. 1a and 1b are cross-sectional views showing the principle of operation of a wavelength-selective fiber coupler with long-period gratings fabricated in the cores or in the claddings of optical fibers.
Figure 1B:
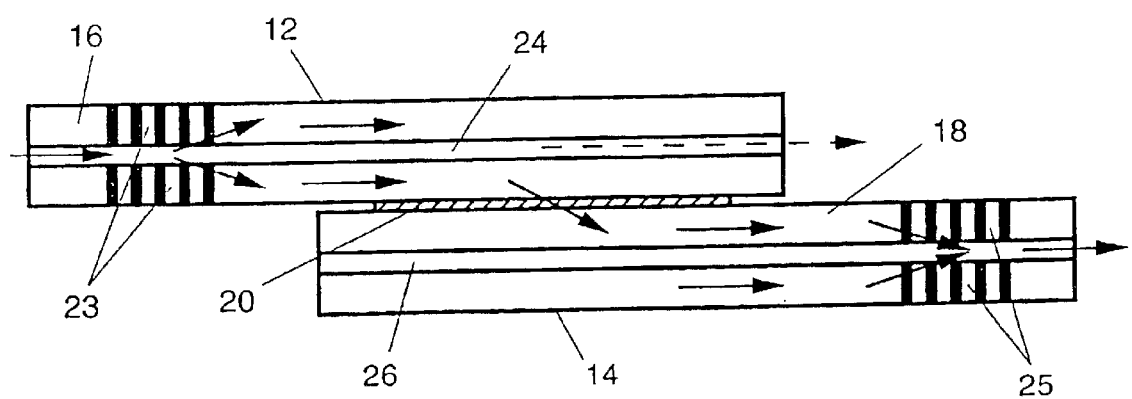

The wavelength-selective coupler of the present invention uses gratings to convert light energy between different modes of two or more waveguides. The principle of operation of a wavelength-selective coupler is illustrated in FIGS. 1a and 1b and described with the use of long-period gratings, although as discussed below, short-period (Bragg) gratings could be used. The coupler has a first waveguide shown as a main carrier first fiber 12 for receiving light from a light source (not shown) and a second waveguide shown as a channel-dropping target second fiber 14 for providing light at a desired wavelength. A cladding 16 of the main carrier fiber and a cladding 18 of the channel-dropping fiber are in close contact within a coupling region 20.

In FIG. 1a, a first long-period grating 22 is provided in the main carrier fiber 12 before the coupling region 20. The length and coupling coefficient of this grating are chosen to transform a desired fraction of light energy at a particular wavelength from the core mode into a forward-propagating cladding mode. The first long-period grating 22 may be inscribed in either the core 24 of the fiber as shown in FIG. 1a, or, as shown in FIG. 1b, the first long-period grating 23 may be in the cladding 16 of the main carrier fiber. A long-period grating could, alternately, be inscribed in both core 24 and cladding 16.

Light in the cladding mode travels in the cladding of the main carrier fiber 12 until it reaches coupling region 20. Although light in a cladding mode is concentrated inside a fiber cladding, its evanescent field extends outside of the cladding, typically for a distance of several microns. Thus, the cladding mode can be affected from outside the fiber. In particular, a part or all of the cladding mode energy can be coupled into another fiber, provided that the fibers are in close contact.

In FIGS. 1a and 1b, coupling is achieved between claddings 16 and 18 within coupling region 20. For efficient mode coupling with no additional gratings, light in the respective cladding modes of fibers 12 and 14 should propagate with the same speed, a condition that is readily achieved if fibers 12 and 14 are similar. In this case, light in the cladding mode of main carrier fiber 12 will couple into the identical cladding mode of channel-dropping fiber 14 when the two fibers are in close proximity over a coupling region 20. Alternatively, to enhance the coupling of light between dissimilar cladding modes of the fibers 12 and 14, a grating structure (not shown) can be imposed in coupling region 20.

Fibers 12 and 14 should be in close proximity to achieve strong coupling between the cladding modes. Preferably, the distance between claddings 16 and 18 should not exceed 10 microns throughout the length of the coupling region 20. In general the coupling medium 20 can have a refractive index either less than, greater than, or in between the refractive index (or indices) of the claddings of the two fibers. The length of coupling region 20 preferably ranges from 1 mm to 500 mm in a lengthwise direction.

In FIG. 1a, light in cladding mode 18 of fiber 14 can be transformed into a core mode of fiber 14 using another long-period grating 24 in core 26 of second fiber 14. Alternatively, as shown in FIG. 1b, long-period grating 25 in fiber 14 can be fabricated in the fiber's cladding. The length and the coupling strength of grating 24 are chosen such that the coupling has the desired efficiency.

Figure 2:
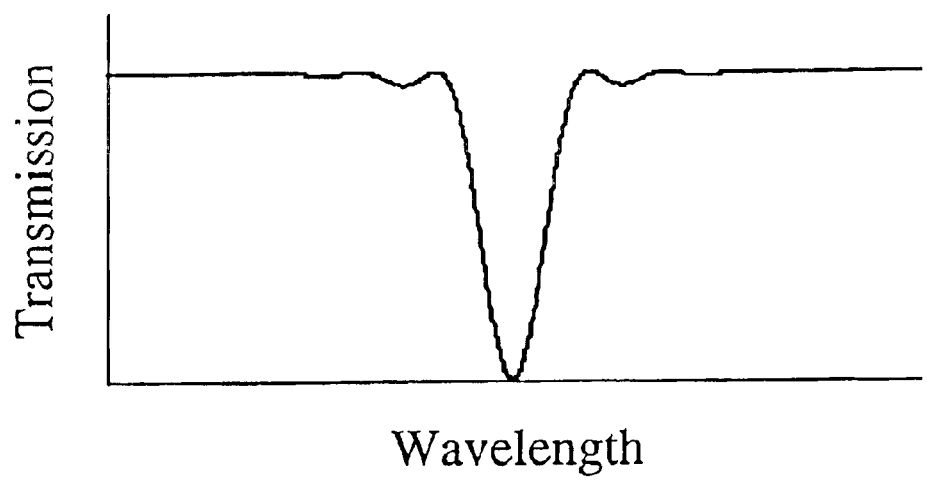
FIG. 2 represents a typical spectrum of light transmitted through the core of the first fiber of the wavelength-selective coupler.
Figure 3:
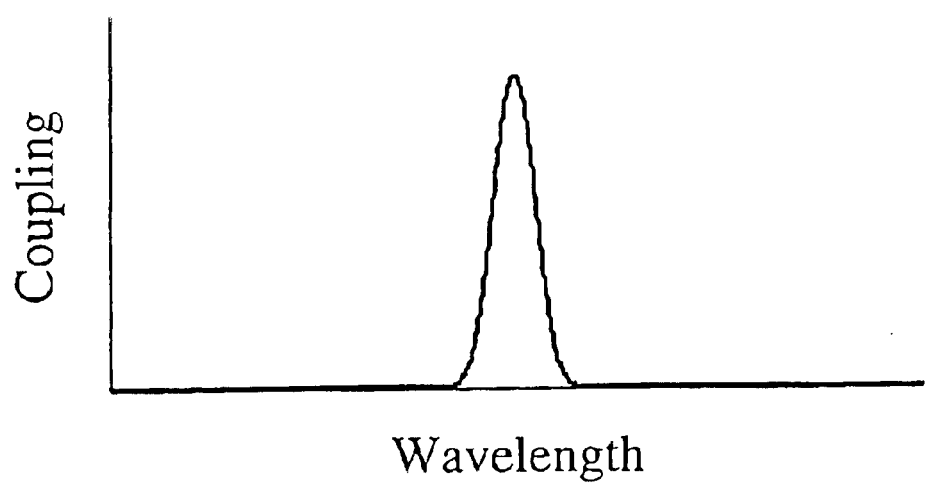
FIG. 3 shows a typical spectrum of light coupled into the core of the second fiber of the wavelength-selective coupler.

As a result of the mode couplings, the light in the core mode of main carrier fiber 12 is eventually coupled into the core mode of second fiber 14. This light coupling is wavelength selective, with the selected wavelength determined by the resonance wavelengths of long-period gratings 22 and 24. Non-resonant wavelengths are not affected, so the device of the present invention potentially produces no loss for the non-resonant channels. The transmission through main carrier fiber 12 is shown on FIG. 2 and the spectrum of dropped light is shown in FIG. 3.

The fibers are preferably surrounded by a heat-shrink tubing, as identified in the example below.

Figure 4:
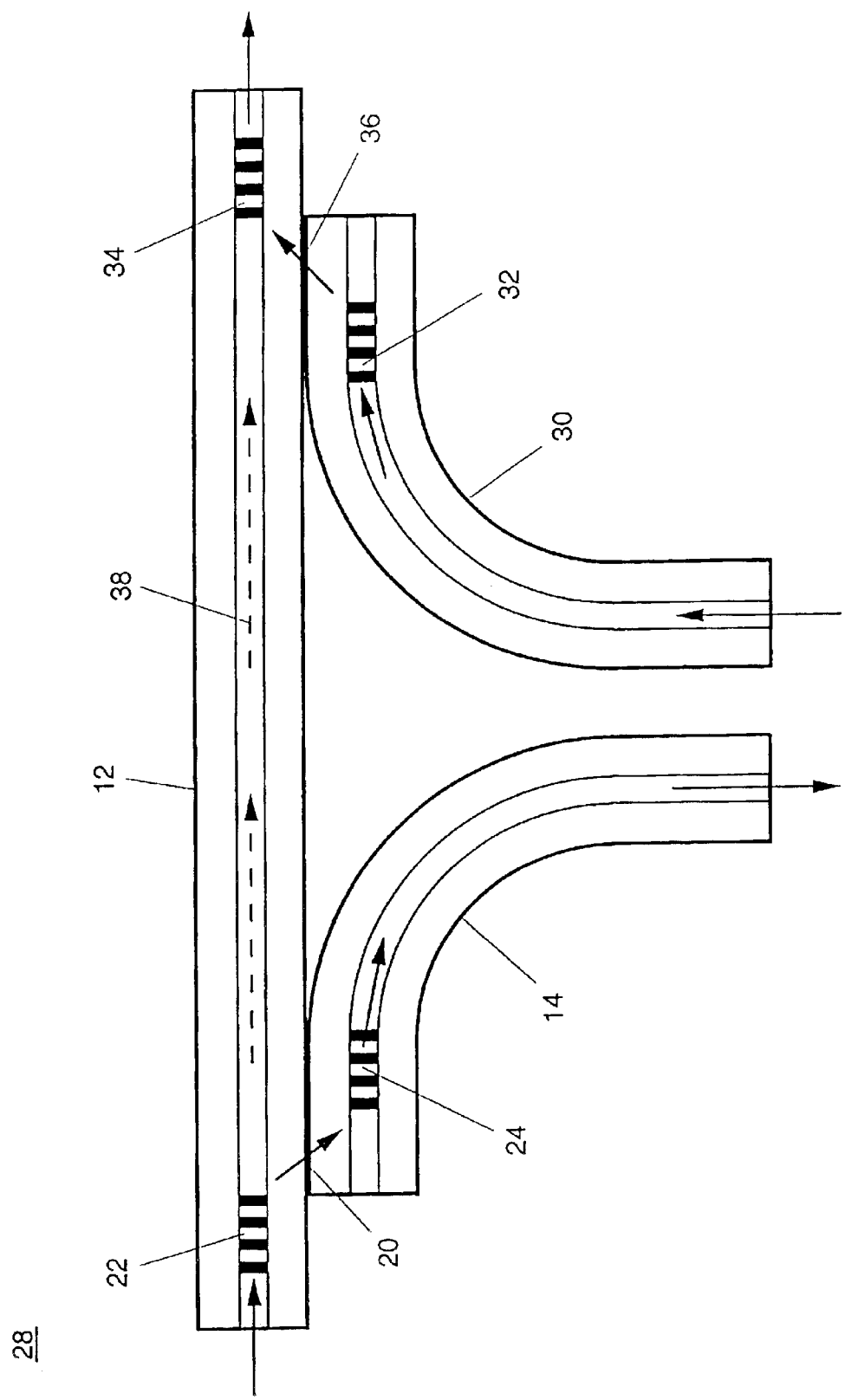
FIG. 4 demonstrates the use of two wavelength-selective couplers in order to make an add/drop multiplexer.

The wavelength-selective coupler of the present invention can serve as a basic element for fabricating other devices for optical communications that require wavelength-selective separation of combinations of light. For example, FIG. 4 illustrates the construction of an add/drop multiplexer based on the coupler of the present invention. In this embodiment, the add/drop multiplexer 28 has a main carrier fiber 12, a channel-dropping fiber 14 and a channel-adding fiber 30. A first long-period grating 22 and a second long-period grating 34 are fabricated in the main carrier fiber 12, and additional long-period gratings 24 and 32 are inscribed in fibers 14 and 30, respectively. In the device 28 shown on FIG. 4, the long-period gratings are shown as being inscribed in the cores of the fibers, however the gratings could alternatively be fabricated in their claddings as in the embodiment of FIG. 1b.

The multiplexer can be made so that the wavelengths of the added channel and the dropped channel are the same or different.

Figure 5:
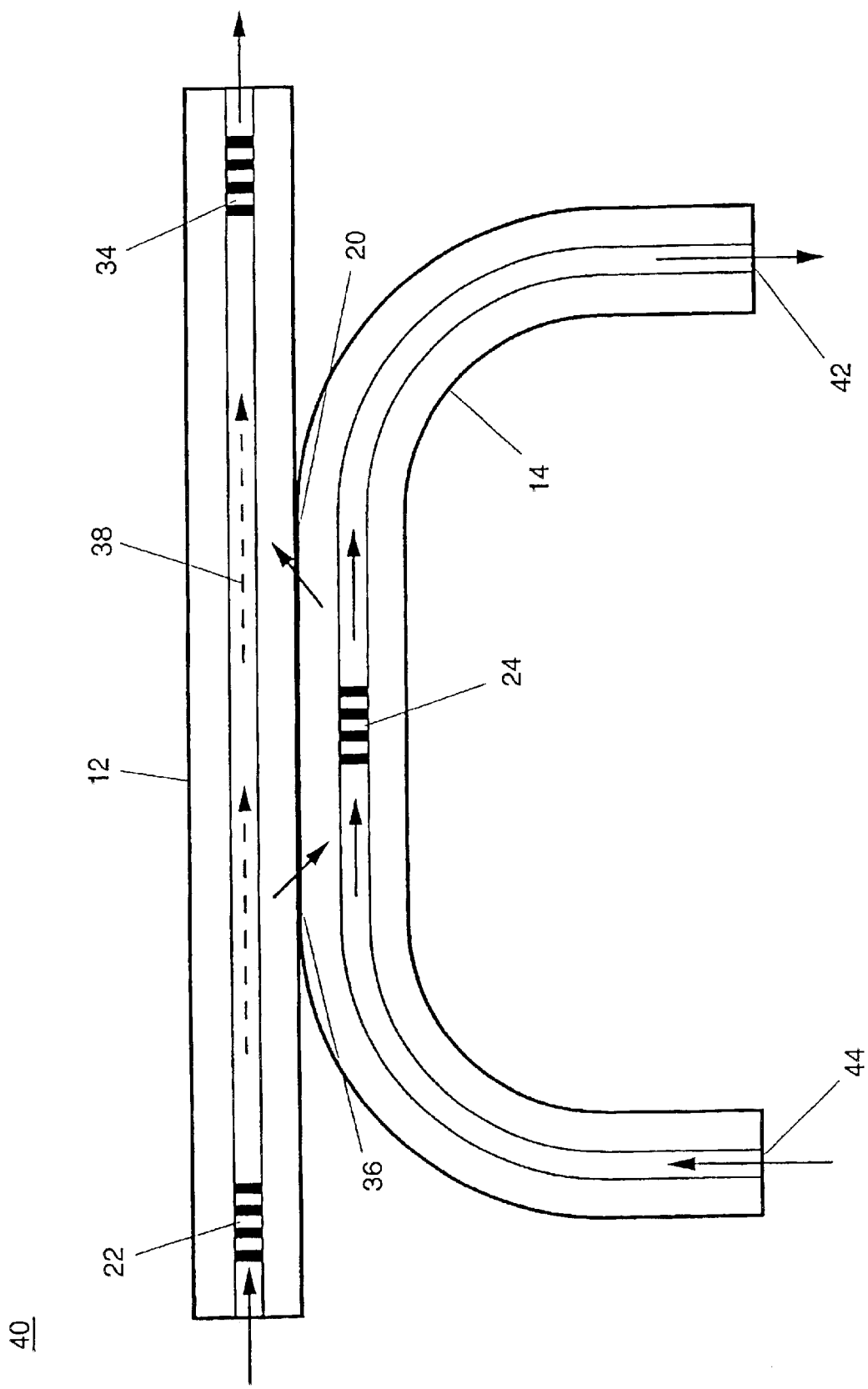
FIG. 5 illustrates another configuration of the add/drop multiplexer in which the same grating serves for both adding and dropping a channel.

FIG. 5 shows another embodiment for making an add/drop multiplexer 40. In this configuration, grating 24 and fiber 14 serve to both drop and add a channel. The dropped channel will emerge from a port 42. The channel to be added is provided into a port 44. Because a long-period grating is a linear optical element, channel adding and dropping can be performed at the same time without interference between the added and dropped signals. In this case, the wavelength of the added and dropped channel will be the same.

Figure 6:
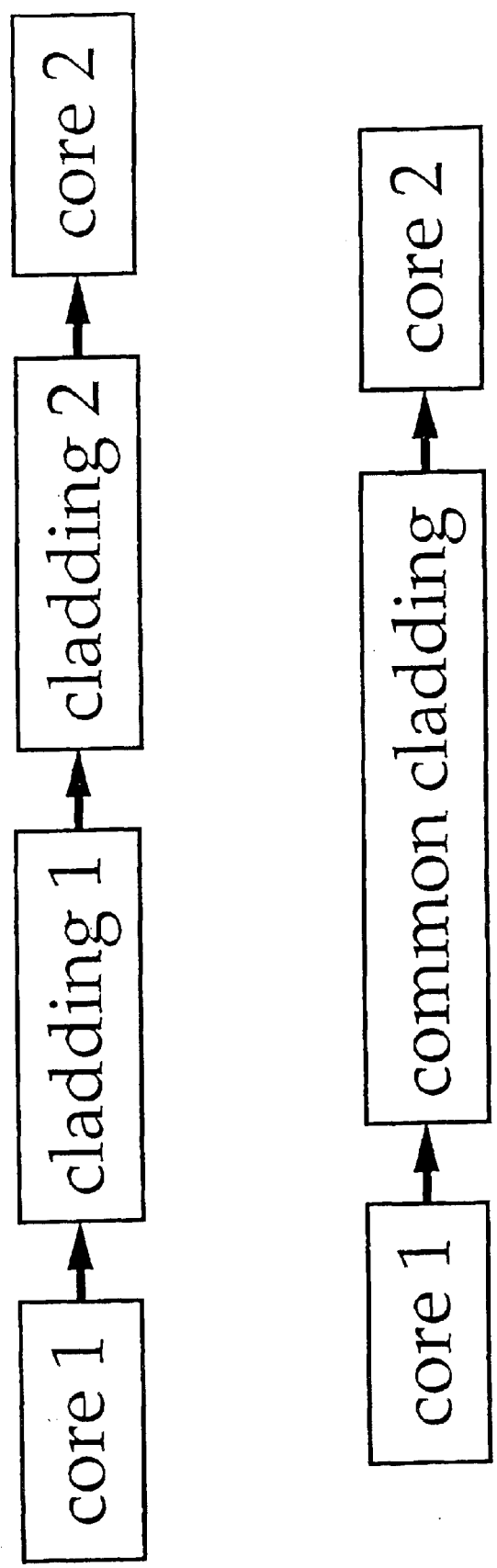
FIG. 6 shows two possible sequences of mode transformations in the invented coupler.

Another extension of this invention is to use an optical fiber with multiple cores and a common waveguiding cladding as shown schematically on FIG. 6. In this embodiment, a long-period grating inscribed in one of the input cores transforms the mode of this core into a guided mode of the common cladding at a predetermined wavelength. This common cladding mode can be selectively coupled into one of the output cores by use of a specially designed long-period grating written in that output core. This arrangement can be used to make wavelength-dependent optical interconnections, which is useful in particular for communication systems that use Wavelength-Division Multiplexing (WDM).

Figure 7:
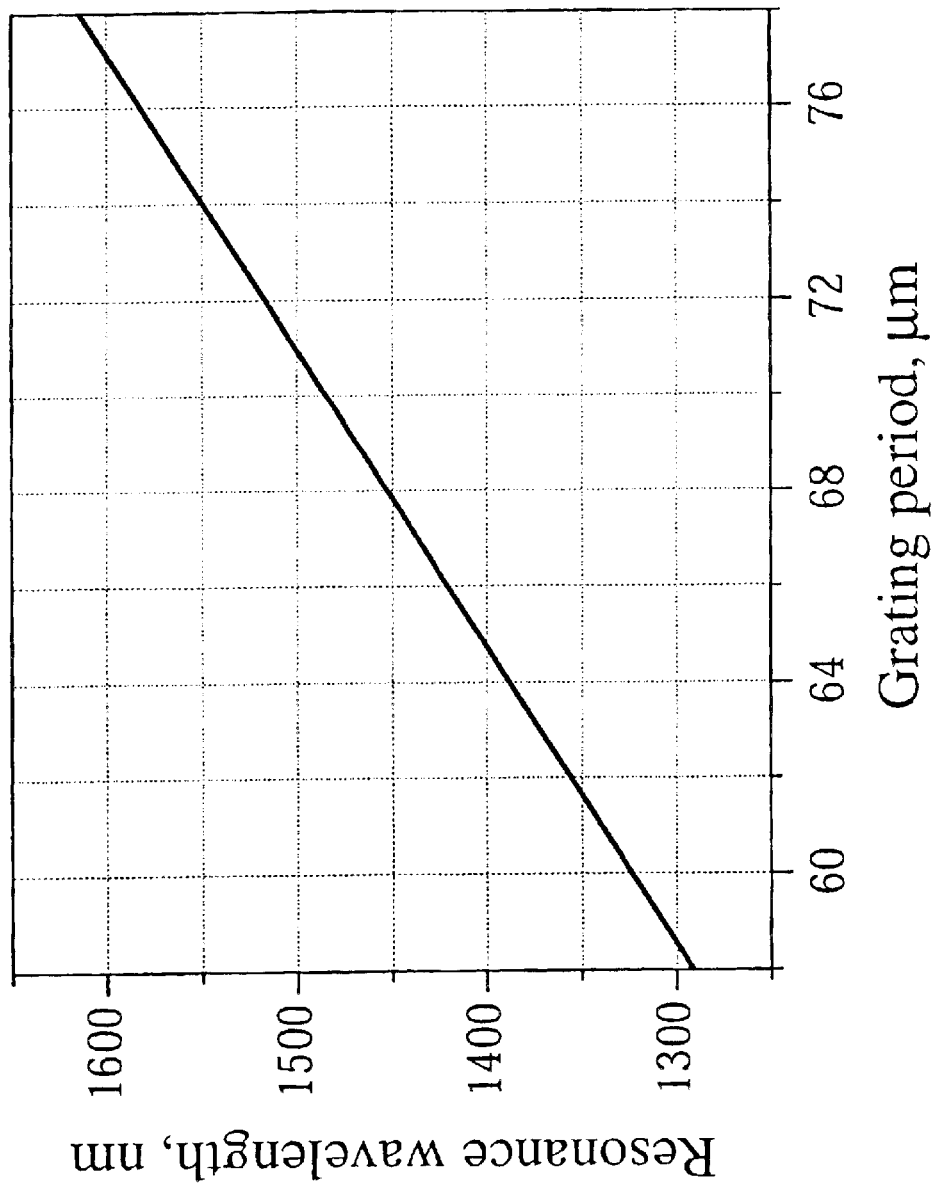
FIG. 7 is a graph showing the variation of a coupling resonance in one fiber versus the period of a long-period grating in the fiber.

FIG. 7 shows how the coupling wavelength between the core mode and a cladding mode of a single-mode fiber varies with the period of a long-period grating in that fiber.

Figure 8:
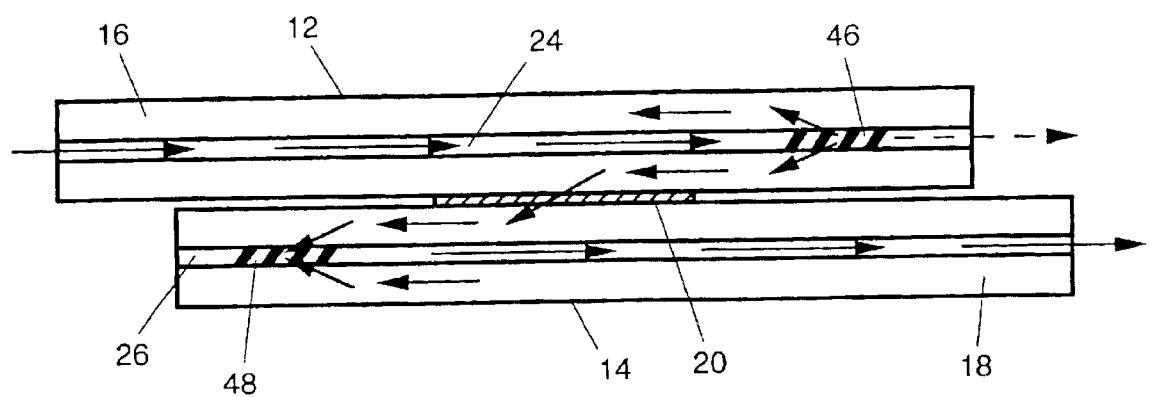
FIG. 8 illustrates the principle of operation of the wavelength-selective fiber coupler in the case when short-period (back-reflecting) gratings are used instead of long-period gratings to couple light from the core into the cladding and back.

The inventive wavelength-selective coupler can also be implemented using one or more short-period (Bragg) gratings to couple light from a core mode into a cladding mode and back. An example is illustrated by FIG. 8. Unlike long-period gratings, short-period gratings can couple light between counter-propagating fiber modes. Therefore, when using short-period gratings, the first such grating 46 should be placed after the mode-coupling region 20. Light launched into the core 24 of the main carrier fiber 16 reaches the grating 46. Short-period grating 46 reflects the resonant portion of light into a backward-propagating cladding mode, while the non-resonant portion of the light continues to propagate down the main carrier fiber 16. The reflected light in the backward propagating cladding mode of fiber 16 reaches the coupling region 20 where it excites a similar, co-propagating cladding mode in the channel-dropping fiber 14. Light in the cladding mode of fiber 14 is then back-reflected by short-period grating 48 into a forward-propagating core mode of the fiber 14. As a result, light originally in a core mode of the main fiber 12 is coupled into a core mode of the charnel-dropping fiber 14. The short-period gratings used in this embodiment may be fabricated with a tilt with respect to the fiber axis in order to increase the light coupling efficiency from the core mode to a reverse-propagating cladding mode. One could also use a long-period grating in one fiber and a short period grating in another fiber to couple light from a core mode into a cladding mode or vice versa. In this case, the long-period grating is positioned according to FIG. 1, and the short-period grating is positioned according to FIG. 8.

Operation of the Invention

A grating typically consists of a periodic perturbation of the refractive index of the core and/or the cladding of the fiber. Such an index variation can be effected in a number of ways. One way is with a spatially periodic pattern of ultraviolet light. Alternatively, one can illuminate the fiber from the side with a temporally periodic beam of ultraviolet light as the fiber and the ultraviolet light beam are translated relative to each other along the fiber axis. An acoustic wave traveling in the fiber can serve as a grating. A long-period grating can also be impressed in a fiber by squeezing the fiber in a clamp having a periodic surface or corrugation. The fiber can also be subjected to a series of microbends in a serpentine fashion to cause light to couple between the core and cladding modes. A long-period grating can contain many subgratings superimposed to provide for multiple resonances or for an arbitrarily shaped spectral response. The gratings can be apodized, for example, with a Gaussian shape.

Light coupling via a long-period grating is sufficiently efficient when the grating's periodicity is chosen to satisfy a phase-matching condition between the two coupled optical modes. The coupling is effective when the grating-assisted scattering of light from the initial core mode is in resonance with another core mode or one of the cladding modes. This happens when the period of the grating A, defined as the distance over which the grating pattern repeats, satisfies the following phase-matching condition:

$$\Lambda = \frac{\lambda}{n_{\mathit{eff}}^{co} - n_{\mathit{eff}}^{cl}}, \quad (1)$$

In Equation 1 the effective index of refraction of the core mode, $n_{\mathit{eff}}^{co}$, is the ratio of the speed of light in vacuum to the speed of light propagation in the core mode. Also, the effective index of refraction of the cladding mode, $n_{\mathit{eff}}^{cl}$, is the ratio of the speed of light in vacuum to the speed of light propagation in the cladding mode. In Eq. 1, $\lambda$ is the resonant wavelength measured in vacuum. For given values $n_{\mathit{eff}}^{co}$, $n_{\mathit{eff}}^{cl}$, and $\Lambda$, Eq. 1 predicts a certain value for the resonant wavelength $\lambda$. Therefore, long-period gratings are wavelength-selective elements.

FIG. 7 shows a typical plot of the resonant coupling wavelength versus the period of a long-period grating. Light at non-resonant wavelengths is not coupled by the grating and so, as in FIGS. 1a and 1b, continues to propagate through the fiber with minimal loss.

In the preferred design, two fibers are placed in close contact but no fusion of the two fibers is required (or desired). Light is injected into the core of the first fiber. A long-period grating in the first fiber transfers light energy from the first fiber's core mode into a cladding mode of that fiber at a predetermined wavelength; other wavelengths are not affected. Light can propagate in a cladding mode over many meters with low loss. The light propagates in the cladding mode of the first fiber to a region of close physical proximity between the two fibers where it excites a similar cladding mode in the second fiber. A second long-period grating inscribed in the second fiber transforms light in the second fiber's cladding mode into the second fiber's core mode. As a result, only light that is transferred by both long-period gratings will be coupled from the core of the first fiber into the core of the second fiber.

In an alternative design, the fibers may have a common cladding. In this design one long-period grating couples a selected wavelength from the first core into a mode of the common cladding, and another long-period grating couples the cladding mode into the second core.

The disclosed wavelength-selective coupler can serve as an add/drop multiplexer in an optical communication system, including Wavelength-Division Multiplexing systems. The channel-dropping function of the add/drop multiplexer 28 shown in FIG. 4 is similar to that of the coupler 10 described in FIGS. 1a and 1b above. However, for adding a channel, the add/drop multiplexer 28 employs a coupler arranged in a reverse order, i.e., light enters channel-adding fiber 30 and is converted into a cladding mode by a grating 32. Light in this cladding mode is then transferred within a mode-coupling region 36 into a similar cladding mode in main carrier fiber 12. Finally, long-period grating 34 transforms light from the cladding mode of fiber 12 into a core mode of fiber 12. As an added benefit of this configuration, the grating 34 provides additional attenuation for that small portion of light 38 resonant with long-period grating 22 yet still remaining in the main carrier fiber 12 after passing through the dropping grating 22. Grating 34 will couple that remaining energy into a cladding mode, and the energy in that cladding mode will then be absorbed by the fiber coating. Because each grating can convert light energy between modes with >99% efficiency, the undeflected portion of light having the same wavelength as the dropped channel will experience >40 dB loss.

The devices of the present invention with multiple long-period gratings thus have high channel isolation, almost no back-reflection, and low insertion loss.

In a fiber laser, light needs to have sufficient intensity in a fiber with a doped core (doped typically with erbium or ytterbium or both). The device of the present invention can be used to introduce light energy into a number of separate optical input fibers from pump laser sources and to couple that light energy into a target fiber. If the light intensity is sufficient to serve as a pump for a fiber laser, the target fiber can be used as a fiber laser or a fiber optical amplifier.

EXAMPLE

To fabricate a working wavelength-selective coupler, a photosensitive fiber (type PS1500H from Fibercore Ltd., U.K.) was used with a numerical aperture NA=0.3, cutoff wavelength $\lambda$=1464 nm, and an outer diameter of the cladding d=125 microns. A frequency-doubled argon laser (model # Innova SHG from Lexel Laser, Inc., California) emitting light in continuous-wave mode at 244 nm was used to fabricate the periodic perturbations as long-period gratings in two optical fibers. The fibers were each exposed along their length over time with a square-wave pattern of UV light, so that the lengths of the exposed regions were half of the grating period and each exposed region received ~8 kJ/cm² of UV light at 244 nm. This UV exposure produced a long-period grating in the core of each fiber with period $\Lambda$=74 microns and length L=2.5 cm. Each grating coupled 98% of light at the resonant wavelength 1549.0 nm from the single core mode into a cladding mode of the same fiber. The two fibers were then aligned parallel to each and with their long-period gratings separated by 5 cm as measured along the direction of the fibers. The fibers were surrounded by a heat-shrink Teflon microtubing (refractive index n=1.35). The small refractive index of this tubing allowed the propagation of light in the cladding mode with minimal loss. After tubing shrinking, the separation between the claddings of the two fibers was less than 10 microns. The separation should be kept as low as possible for efficient overlap of the cladding modes. In this particular coupler, ~16% efficiency was achieved for coupling of light from the input core to the output core at 1541 nm using a broadband infrared light-emitting diode (LED) as a light source. In principle it should be possible to achieve 100% coupling from the core of the first fiber to the core of the second fiber by using 100% efficient gratings and a more uniform cladding mode coupling region. The bandwidth (full-width-at-half-maximum) of the resonant peak was 3.2 nm. The bandwidth can be reduced by making a grating longer, or it can be increased by making a grating shorter. The suppression of non-resonant light was >40 dB. No back-reflection was detected. The insertion loss for the non-resonant light was ~1 dB due to splicing loss to a standard telecom SMF-28 fiber. This loss can be reduced to less than 0.1 dB by known special splicing techniques or by using different fibers.

The wavelength(s) of operation can be adjusted by a proper choice of the grating period of the long-period grating. An example of how the grating period control the wavelength of operation is shown in FIG. 7. The range of operating wavelengths includes the 1.3 and the 1.55 micron communication bands, as well as the 980 nm wavelength of pump lasers (not shown in FIG. 7).

The present invention can be used to couple light from an optical fiber to a planar waveguide and back. In this case, the cladding of the fiber and the core of the planar waveguide are placed in close contact over a distance to form a coupling region. Again, the separation between the fiber cladding and the waveguide core should be as small as possible and preferably no more than 10 microns. A grating inscribed in the fiber transfers light from the core of the fiber into its cladding. Then, the cladding mode excites a mode of the planar waveguide. The optimal coupling is achieved when the fiber cladding mode and the waveguide mode propagate at the same speed. For this, the fiber cladding must have a refractive index higher than that of the planar waveguide cladding.

This can be accomplished by doping the cladding of the planar waveguide with index-lowering components, such as fluorine.

The scope of the invention should be determined by the appended claims, and embodiments other than those expressly described herein.

We claim:

1. An optical device comprising:
an input fiber having a cladding and a core for receiving a light input;
a target fiber having a cladding and a core;
the cladding of the input fiber and the cladding of the target fiber being close together to define a coupling region in which light is coupled from the cladding of the input fiber to the cladding of the target fiber;
a first perturbation for wavelength-selective coupling of light from the core of the input fiber into the cladding of the input fiber; and
a second perturbation for wavelength selective coupling of light from the cladding of the target fiber into the core of the target fiber,
wherein at least one of the first and second perturbations is in the cladding and the first perturbation and the second perturbation do not overlap, and the coupling region is located between the first and second perturbations in a lengthwise direction.

2. The device of claim 1, wherein the coupling region is between 1 mm and 500 mm long along a lengthwise direction of the fibers.

3. The device of claim 1, wherein the fibers are no more than about 10 microns apart in the coupling region.

4. The device of claim 1, wherein the second perturbation is formed in the cladding of the target fiber.

5. The device of claim 4, wherein the core of the target fiber does not have a wavelength-selective perturbation.

6. The device of claim 1, wherein the first perturbation is formed in the cladding of the input fiber.

7. The device of claim 6, wherein the core of the input fiber does not have a wavelength-selective perturbation.

8. The device of claim 6, wherein the second perturbation is formed in the cladding of the target fiber.

9. The device of claim 8, wherein neither the core of the input fiber nor the core of the target fiber has a wavelength-selective perturbation.

10. The device of claim 1, further comprising a third fiber with a core and a cladding and a third perturbation formed in the one of the core and cladding of the third fiber, wherein the target fiber is used to remove light with a first wavelength from the input fiber, and wherein the third fiber receives a light input and is positioned close to the input fiber to define a coupling region to couple light with a second wavelength from the third fiber define a coupling region to couple light with a second wavelength from the third fiber into the input fiber, the third fiber being used to add light with a desired wavelength.

11. The device of claim 10, wherein the first and second wavelengths are the same.

12. The device of claim 1, further comprising third perturbation for wavelength-selective coupling of light from the cladding of the input fiber to the core of the input fiber, the perturbations being arranged such that light with a first wavelength is input to the target fiber and included in an output of the input fiber, and light with a second wavelength is dropped from the input fiber.

13. In the optical device of claim 1, further comprising a third fiber having a core and a cladding with the core of the third fiber receiving a light input and providing some of the received light to the target fiber, the third fiber having a third perturbation for wavelength-selective coupling of light from the core of the third fiber into the core of the target fiber, the claddings of the third fiber and the target fiber being close together in a second coupling region, a method of introducing into the input fibers light so that a portion of light from each of the input fibers combines in the target fiber.

14. The method of claim 13, wherein the introducing is performed with pump lasers.

15. The method of claim 13, wherein the light that is introduced results in light in the target fiber that is sufficiently intense for use as a pump for a fiber laser.

16. An optical device comprising:
a first fiber having a cladding and a core for receiving a light input and providing an output;
a second fiber having a cladding and a core;
the cladding of the first fiber and the cladding of the second fiber being close together to define a coupling region in which light is coupled from the cladding of the first fiber to the cladding of the second fiber;
a first perturbation for wavelength-selective coupling of light from the core of the first fiber into the cladding of the first fiber;
a second perturbation for wavelength-selective coupling of light form the cladding of the second fiber into the core of the second fiber;
wherein the second fiber receives a light input and the second perturbation provides wavelength-selective coupling from the input of the second fiber to the cladding of the second fiber and the coupling region couples the light from the cladding of the second fiber to the cladding of the first fiber; and
a third perturbation located in the first fiber for wavelength-selective coupling of the light coupled from the cladding of the second fiber into the cladding of the first fiber into the core of the first fiber, the device thereby forming an add/drop multiplexer in which the second fiber is used to add and drop light at the desired wavelengths.

17. An optical device comprising:
an input fiber having a cladding and a core for receiving a light input;
a target fiber having a cladding and a core;
the cladding of the input fiber and the cladding of the target fiber being close together to define a coupling region in which light is coupled from the cladding of the input fiber to the cladding of the target fiber;
a first perturbation for wavelength-selective coupling of light from the core of the input fiber into the cladding of the input fiber; and
a second perturbation for wavelength selective coupling of light from the cladding of the target fiber into the core of the target fiber,
wherein one of the first and second perturbations is in the cladding and the other of the first and second perturbations is in the core and the coupling region is between the first and second perturbations in a lengthwise direction.

* * * * *

UNITED STATES PATENT AND TRADEMARK OFFICE
CERTIFICATE OF CORRECTION

PATENT NO. : 6,850,665 B2
DATED : February 1, 2005
INVENTOR(S) : Victor Grubsky and Dmitry Starodubov It is certified that error appears in the above-identified patent and that said Letters Patent is hereby corrected as shown below:

Title page,
Item [57], ABSTRACT,
Line 7, delete "cladding's" and insert -- claddings --.

Column 2,
Line 50, delete "cladding cladding" and insert -- cladding --.

Column 6,
Line 67, delete "A" and insert -- $\Lambda$ --.

Column 8,
Line 25, delete "A=74" and insert -- $\Lambda$=74 --.

Signed and Sealed this

Thirty-first Day of May, 2005

JON W. DUDAS
*Director of the United States Patent and Trademark Office*